US010429591B2

(12) United States Patent
Lee et al.

(10) Patent No.: US 10,429,591 B2
(45) Date of Patent: Oct. 1, 2019

(54) INTEGRATED OPTICAL COMPONENTS WITH VARIABLE ATTENUATION OR SWITCHING, AND TAP DETECTOR FUNCTIONS

(71) Applicant: DiCon Fiberoptics, Inc., Richmond, CA (US)

(72) Inventors: Ho-Shang Lee, El Sobrante, CA (US); Brian Chiang, Albany, CA (US)

(73) Assignee: DICON FIBEROPTICS, INC., Richmond, CA (US)

( * ) Notice: Subject to any disclaimer, the term of this patent is extended or adjusted under 35 U.S.C. 154(b) by 475 days.

(21) Appl. No.: 15/184,722

(22) Filed: Jun. 16, 2016

(65) Prior Publication Data
US 2017/0363813 A1    Dec. 21, 2017

(51) Int. Cl.
*G02B 6/35* (2006.01)
*G02B 6/28* (2006.01)
*G02B 6/32* (2006.01)
*H04B 10/25* (2013.01)

(52) U.S. Cl.
CPC ......... *G02B 6/3594* (2013.01); *G02B 6/2817* (2013.01); *G02B 6/32* (2013.01); *G02B 6/3518* (2013.01); *G02B 6/3548* (2013.01); *G02B 6/3588* (2013.01); *H04B 10/25* (2013.01)

(58) Field of Classification Search
CPC ...... G02B 6/3594; G02B 6/2817; G02B 6/32; G02B 6/3518; G02B 6/3588; H04B 10/27; H04J 14/02; H04Q 11/0003
See application file for complete search history.

(56) References Cited

U.S. PATENT DOCUMENTS

| 6,081,638 | A | 6/2000 | Zhou |
| 6,628,856 | B1 | 9/2003 | Costello et al. |
| 6,838,738 | B1 | 1/2005 | Costello et al. |
| 7,184,619 | B2 * | 2/2007 | Kazama ............... G02B 6/32 |
| | | | 385/18 |
| 7,346,240 | B1 | 3/2008 | He et al. |

(Continued)

OTHER PUBLICATIONS

Final Office Action dated Sep. 20, 2018, U.S. Appl. No. 15/226,164, filed Aug. 2, 2016 by Lee et al.

(Continued)

*Primary Examiner* — Kevin K Pyo
*Assistant Examiner* — Don J Williams
(74) *Attorney, Agent, or Firm* — Vierra Magen Marcus LLP (57) ABSTRACT

Integrated optical component combine the functions of a Variable Optical Attenuator (VOA), a tap coupler, and a photo-detector, reducing the size, cost, and complexity of these functions. In other embodiments, the integrated optical component combines the functions of an optical switch, a tap coupler, and a photo-detector. A rotatable mirror is used to adjust the coupling of light from an input port or ports to one or more output ports. A pin hole with a surrounding reflective surface is used at the core end face of one or more output fibers, such that a portion of the output optical signal is reflected to a photodiode chip. The photo-detector provides an indication of the optical power that is being coupled to the output fiber. With appropriate electronic control circuitry, the integrated optical component can be used to set the output optical power at a desired or required level.

37 Claims, 8 Drawing Sheets

(56) References Cited

U.S. PATENT DOCUMENTS

| | | | |
|---|---|---|---|
| 7,600,924 | B2 | 10/2009 | Hama et al. |
| 7,899,330 | B2 | 3/2011 | Ye et al. |
| 2002/0031299 | A1 | 3/2002 | Hatakoshi |
| 2004/0086219 | A1 | 5/2004 | Qiu et al. |
| 2004/0120646 | A1 | 6/2004 | Fushimi et al. |
| 2004/0146298 | A1* | 7/2004 | Ikegame ............ H04Q 11/0005 398/45 |
| 2011/0142395 | A1 | 6/2011 | Fortusini et al. |
| 2013/0230280 | A1* | 9/2013 | Kadar-Kallen ...... G02B 6/4204 385/33 |
| 2016/0264460 | A1 | 9/2016 | Kufner et al. |
| 2017/0276877 | A1 | 9/2017 | Lee et al. |

OTHER PUBLICATIONS

Response to Office Action dated May 21, 2018, U.S. Appl. No. 15/226,164, filed Aug. 2, 2016.

Non-final Office Action dated Feb. 9, 2018, U.S. Appl. No. 15/226,164, filed Aug. 2, 2016.

"Variable Optical Attenuators." DiCon Fiberoptics. 2 pages. [retrieved Jun. 17, 2016] <http://web.archive.org/web/20160617191537/http://www.diconfiberoptics.com/products/main_attenuators.php>.

Non-final Office Action dated Feb. 24, 2017, U.S. Appl. No. 15/226,164, filed Aug. 2, 2016.

Response to Office Action dated Jun. 16, 2017, U.S. Appl. No. 15/226,164, filed Aug. 2, 2016.

Final Office Action dated Oct. 20, 2017, U.S. Appl. No. 15/226,164, filed Aug. 2, 2016.

Response to Final Office Action dated Jan. 9, 2018, U.S. Appl. No. 15/226,164, filed Aug. 2, 2016.

U.S. Appl. No. 16/225,725, filed Dec. 19, 2018 by Lee et al.

Non-final Office Action dated May 6, 2019, U.S. Appl. No. 16/225,725, filed Dec. 19, 2018 by Lee et al.

Response to Office Action dated Jul. 30, 2019, U.S. Appl. No. 16/225,725, filed Dec. 19, 2018 by Lee et al.

* cited by examiner

Optical Power Equalizer

Fused Biconical Tap Coupler
Fig. 4 Prior Art

InGaAs Monitor Pin Photodiode
Fig. 5 Prior Art

INTEGRATED OPTICAL COMPONENTS WITH VARIABLE ATTENUATION OR SWITCHING, AND TAP DETECTOR FUNCTIONS

BACKGROUND

The following is related generally to the optical components used in optical communication networks, and, more specifically, to optical devices that can attenuate or switch optical signals, while also providing the functions of optical power monitoring and detection.

Variable Optical Attenuators (VOAs) and optical switches are widely deployed in optical networks, typically in the 1550 nm or 1310 nm wavelength windows, as well as other wavelength ranges. In wavelength-division-multiplexed optical networks where multiple wavelengths are used, so that multiple channels of information can be transmitted or carried on a single fiber, Variable Optical Attenuators are used at various points in the network, to manage the optical power of the multiple optical signals or wavelengths. Optical signals that are entering the network at a network node may need to have their optical power adjusted to roughly match the optical power of signals that are already present on the fiber. Optical amplifiers may be deployed at various points in the network, to increase the optical power of signals that have traveled down their respective optical fibers for long distances. In general, optical amplifiers increase the power of all wavelengths that are present on a fiber, but the amount of amplification or gain may not be well-controlled, and may not be the same for all wavelengths. For this reason, and others, Variable Optical Attenuators may be used to adjust the optical power level of signals that have been amplified by optical amplifiers. Individual wavelengths that are dropped at a network node may also require attenuation, to adjust their optical power level.

In many of the optical network applications of Variable Optical Attenuators, it is necessary or desirable to monitor the optical power of the signal, after attenuation. (In some cases it may also be desirable to monitor the optical power of the signal prior to attenuation, although this is less common.) In many cases, it is desirable to be able to set the optical power at the VOA output to a specific power level. A closed-loop feedback system may be used to maintain the optical power of the signal at a specified power level, at the output of the VOA, even as the optical power of the signal at the VOA input changes. For this reason, it is common practice to use an optical tap and an optical power detector, at the output of a VOA. The optical tap splits off a small portion of the optical signal at the VOA's output. Depending on the optical power levels involved, and the amount of accuracy required, the percentage of the output signal's optical power that is split off might be 1%, 2%, 5%, or even 10%. The split-off optical signal is then directed to an optical detector device, which converts the optical power to an electrical signal, from which the optical power of the signal can be determined. This information can be used by the network operator, or an intelligent network controller, to set the attenuation level of the VOA, to maintain the optical power at the VOA output, to a specified level. The remainder of the optical signal at the VOA's output (the portion that was not split off and directed to the detector circuit) is than passed on to the rest of the network. The portion of the optical power that was split off by the optical splitter or tap represents a source of insertion loss to the desired/intended optical signal.

Similarly, optical switches are often used in optical networks, and in some cases it is desirable to monitor the optical power of the switched optical signal. For example, in order to monitor the optical power of multiple fibers, an N×1 selector switch may be used to connect one of the N fibers to an optical tap and photo-detector. 2×1 optical switches are frequently used to select between a primary fiber and a secondary or backup fiber, for improved reliability. In this application, it would also be desirable to be able to monitor the optical power of the selected fiber.

Optical splitters or couplers are widely available components that can be used to provide the optical tap function, with a variety of tap ratios (the percentage of the incoming optical power that is split off to one output of the splitter, with the remainder of the optical power being passed to the other output). Optical power detectors, such as photodiodes, are also widely available, with a variety of sensitivities. Optical tap-detectors are components that combine the functions of an optical tap, or splitter, with the optical detector.

Figure 1:
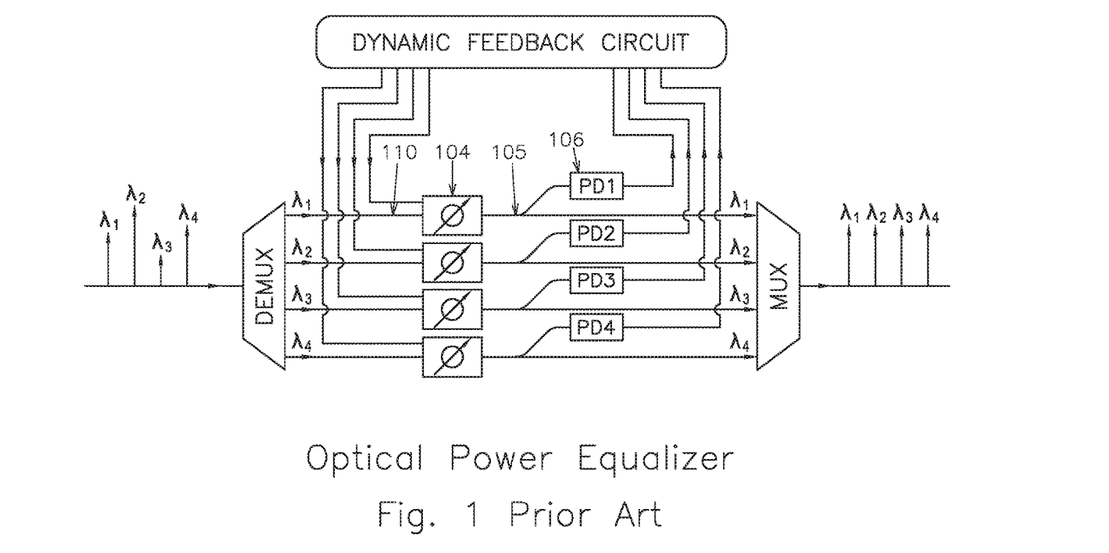
FIG. 1 shows an example that illustrates how Variable Optical Attenuators (VOAs), tap couplers, and photo-detectors can be used in an optical power equalizer.

FIG. 1 shows a prior art optical power equalizer, as used in a wavelength-division-multiplex (WDM) optical network. As multiple wavelengths propagate through fiber, optical amplifier(s), and other optical components, their individual power levels can vary significantly, as a result of wavelength-dependent attenuation and amplification. In order to transmit the optical signals over longer distances, while maintaining a high signal-to-noise ratio before entering the receiver, the optical power of the individual wavelengths needs to be equalized, at some point along the optical transmission path. In FIG. 1, the exemplary four wavelengths $\lambda_1$ through $\lambda_4$, having unequal individual power levels, enter a demultiplexer (marked as DEMUX) and then branch out as four separate wavelengths. Using the optical path of $\lambda_1$ as an example, a small percentage of light from the main path 110 is tapped by an optical tap coupler 105, made by fusing two fibers together (as illustrated subsequently in FIG. 4), or via the use of a thin-film optical filter, or other technology. The tapped signal is than sent to a photo-detector 106 to monitor the power level of the line. A Variable Optical Attenuators (VOA) 104 is adjusted by a dynamic feedback circuit until the desired optical power level is achieved. The same approach is applied to the other three wavelengths, or channels. Therefore, when the four wavelengths are combined by the wavelength multiplexer (marked as MUX), their individual optical power levels are equal.

Figure 2:
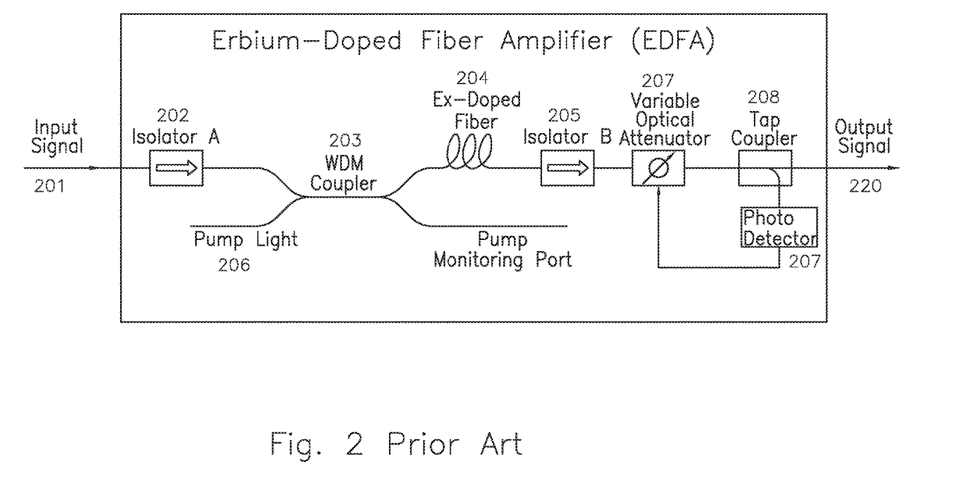
FIG. 2 illustrates an example in which a VOA, tap coupler, and photo-detector are used with an Erbium doped fiber amplifier (EDFA), to monitor and adjust the optical power of the output signal.

FIG. 2 shows a similar prior art application of a VOA 207, tap coupler 208, and photo-detector 207, to monitor and control the optical power at the output of an Erbium-doped fiber amplifier, or EDFA. Because the inherent gain or optical amplification provided by an EDFA may be variable and difficult to control, and the optical power level of the input signal 201 may also vary significantly, the combination of the VOA, tap coupler, and photo-detector allows for a more precise setting of the optical power of the output signal 220.

As has been occurring with cell phones, and other forms of modern electronic devices, more and more optical components are being squeezed into individual optical modules, or more highly-integrated optical components, in order to save space, reduce cost, and also to upgrade the performance of optical networks and network control centers. Fiber splicing between separate fiber optic components is cumbersome, and also occupies space. Consequently, optical networks could be improved by integrating multiple optical components into a single package. Since Variable Optical Attenuators (VOAs) are frequently used with optical tap detectors, such networks could be improved by integrating the functions of optical power attenuation and optical power monitoring into a single, integrated optical component. Similarly, it can be useful to be able to integrate the functions of optical switching and optical power monitoring, into a single, integrated optical component.

SUMMARY

A tunable optical device includes a reflector positionable to reflect a portion of a beam of light incident upon it from an input port in an optical path between the input port and an output port. A surface is located in the optical path between the reflector and the output port, the surface having an opening through which the reflected portion of the light beam is transmittable between the reflector and the output port. The opening has an adjacent reflective region on the surface and a photo-detector is configured such that a portion of the beam of light incident on the reflective region adjacent to the opening is reflected onto it. An actuator is connected to change a position of the reflector so that a selectable amount of the beam of light reflected from the reflector is transmitted through the opening along the optical path from the input port to the output port.

An optical system includes a tunable optical device and control circuitry. The tunable optical device includes a reflector positionable to reflect a portion of a beam of light incident upon it from an input port in an optical path between the input port and an output port. A surface is located in the optical path between the reflector and the output port, the surface having an opening through which the reflected portion of the light beam is transmittable between the reflector and the output port. The opening has an adjacent reflective region on the surface and a photo-detector is configured such that a portion of the beam of light incident on the reflective region adjacent to the opening is reflected on to it. An actuator is connected to change a position of the reflector so that a selectable amount of the beam of light reflected from the reflector is transmitted through the opening along the optical path from the input port to the output port. The control circuitry is connected to the photo-detector to receive an indication of an amount of light incident upon and connected to the actuator to change the position of the reflector in response to the indication.

A method includes receiving a beam of light from a first port. A portion of the beam of light from the first port is reflected by a reflector in an optical path between the first port and a second port. The optical path includes a surface located between the reflector and the second port, the surface having a first opening through which the reflected portion of the light beam is transmittable between the reflector and the second port. The first opening has an adjacent reflective region on the surface. A portion of the beam of light incident on the reflective region adjacent to the first opening is reflected on to a first photo-detector. The reflector is positioned so that a selectable amount of the beam of light reflected from the reflector is transmitted through the first opening along the optical path from the first port to the second port.

Various aspects, advantages, features and embodiments are included in the following description of exemplary examples thereof, which description should be taken in conjunction with the accompanying drawings. All patents, patent applications, articles, other publications, documents and things referenced herein are hereby incorporated herein by this reference in their entirety for all purposes. To the extent of any inconsistency or conflict in the definition or use of terms between any of the incorporated publications, documents or things and the present application, those of the present application shall prevail.

DETAILED DESCRIPTION

The exemplary embodiments described in the following are integrated optical components that combine the functions of variable optical attenuation, or optical switching, as well as the detection of optical power. In some embodiments, the integrated optical component therefore combines the functions of a Variable Optical Attenuator (VOA), a tap coupler, and a photo-detector, reducing the size, cost, and complexity of these functions. In other embodiments, the integrated optical component combines the functions of an optical switch, a tap coupler, and a photo-detector. The examples presented here are based on VOA and optical switch structures in which a rotatable mirror is used to adjust the coupling of light from an input optical fiber to one or more output optical fibers, or the coupling of light from one or more input fibers to an output fiber. A pin hole with a surrounding reflective surface is used at the core end face of one or more output fibers, such that a portion of the output optical signal is reflected to a photodiode chip. The photodiode chip provides an electrical signal that is a function of the optical power that is being coupled to the output fiber. With appropriate electronic control circuitry, the integrated optical component can be used to set the output optical power at a desired or required level.

Figure 3:
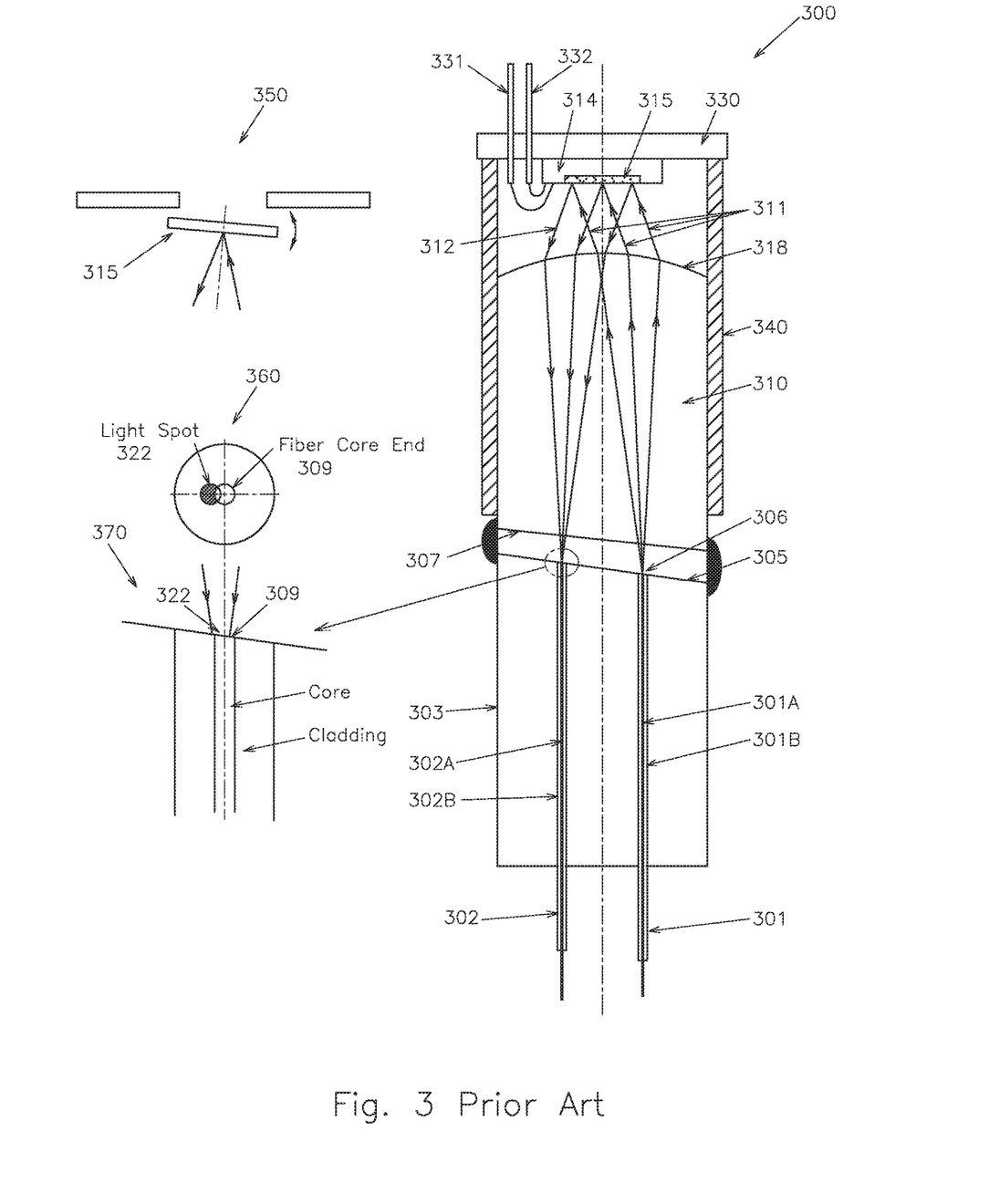
FIG. 3 illustrates one embodiment of a VOA optical component, comprising a tilting mirror that is implemented as a micro-electro-mechanical-system (MEMS) device, to achieve attenuation adjustment.

More specifically, an optical fiber, as used in optical communication systems or networks, includes a transparent core surrounded by a cladding material that has a refraction index that is lower than that of the core. Light is confined in the core by total internal reflection, occurring at the interface of the core and the cladding. If the core of the fiber carries only one propagating mode, then it is called a single-mode fiber. The fiber is called multi-mode fiber if it carries more than one mode of light propagation. FIG. 3 illustrates an example of a Variable Optical Attenuator, or VOA (300). In this embodiment, the input and output ports are respectively supplied from an input optical fiber 301 and an output optical fiber 302 that are embedded in a ferrule 303 that has a well-polished slanted surface 305. 301A and 301B are the core and cladding of the input fiber 301, respectively. Similarly, 302A and 302B are the core and cladding for the output fiber 302. The purpose of slanted surface 305, with a small angle with respect to the axes of fibers 301 and 302, is to prevent the Fresnel reflection that occurs at the surface 305 from returning to the fibers. A similar function is provided by the slanted surface 307 of the collimating lens 310. The slant angle is typically 3 to 10 degrees, in order to provide sufficient reduction of back reflection. The optical power that emerges from the core end face 306 of the fiber core 301A, propagates through the lens body 310, and spreads out in an angle that is defined by the numerical aperture of the fiber. This optical power is then refracted at the convex surface 318 of the lens 310, and is collimated as a parallel beam 311, before striking the surface of a rotatable mirror 315. In this embodiment, the rotatable mirror is implemented as part of a MEMS chip 314. Note that the simple convex lens 310 shown in FIG. 3 can be replaced by a double convex lens, a gradient-index lens, or some other form of lens, as long as the lens is able to provide a suitable collimation function. The collimated beam 311 is then reflected by the rotatable mirror 315 (also shown in more detail in inset drawing 350). For more details of MEMS-based tilting or rotatable mirror design, please refer to U.S. Pat. Nos. 6,838,738 and 6,628,856. The reflected collimated beam 312 is focused by the convex surface 318 of the lens 310 into a light spot 322, onto the slanted surface 305. As shown in exploded view 370, and in the corresponding cross-section view 360, the reflected and focused light spot 322 partially overlaps the fiber core end face 309 of the output fiber core 302A. By changing the driving voltage to the MEMS chip, to tilt the mirror 315, the focused light spot 322 can be moved around on the slanted surface 305. Thus, the separation or alignment between the fiber core end face 309 and the light spot 322, and therefore the amount of overlap, can be varied accordingly. The separation or degree of overlap determines the percentage of optical power that is coupled from the input fiber 301 to the output fiber 302. If the center of the light spot 322 is completely matched or aligned to the center of the fiber core end face 309, the attenuation or insertion loss is kept to a minimum. In contrast, the attenuation is maximized when the light spot 322 has no overlap with the core end face 309 at all.

In order to control the tilt angle or rotation of the reflector mirror 315, two electrodes 331 and 332 are inserted through a chip header 330, and are wire-bonded to apply a control voltage to the MEMS chip 314. Inset drawing 350 is a blow-up view of MEMS chip 314. MEMS chip 314 is mounted directly onto the chip header 330. An outer tubing 340 is used to join the lens body 310 to the header 330.

The optical component structure shown in FIG. 3 can also be used as an on/off optical switch. By adding a second output fiber, a similar structure can be used to implement a 1×2 optical switch, or a two-channel VOA. The addition of more output fibers results in a 1×N optical switch, or an N-channel VOA. All of these structures can be bi-directional, or optically reversible, such that they may also be configured or used as 2×1 optical switches, N×1 optical switches, etc.

Figure 4:
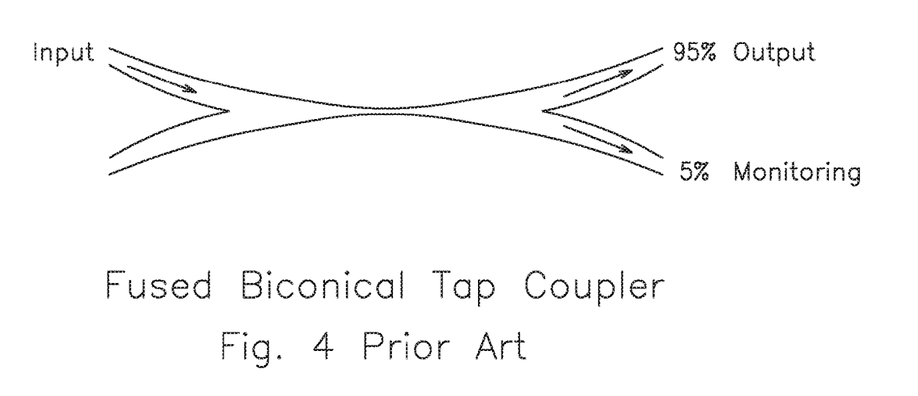
FIG. 4 illustrates an example of a fiberoptic fused biconical tap coupler, being used for tapping a small percentage of power off of the main fiber path for monitoring purposes.

FIG. 4 shows an example of a fused biconical tap (FBT) coupler being used to tap a small percentage of light from the main line. These are also referred to as fused biconical tapered couplers. FBT couplers are fabricated by placing two optical fibers adjacent to each other, and then fusing them together while stretching them, so that a region of light coupling is formed in the fused area, due to the proximity of the optical cores of the two original fibers. By carefully controlling the fusing and stretching process, the amount of coupling from one of the original fibers to the other can be controlled. In the example shown in FIG. 4, 5% of the optical power of the input signal is coupled to the monitoring fiber output, while the remaining 95% of the optical power is passed on to the output fiber. FBT couplers with a variety of tap ratios (the ratio of the optical power coupled to the monitoring fiber output, to the optical power passed to the output fiber) are commercially available, with the monitoring fiber output power set to values such as 1%, 2%, 5%, or 10% for tap coupler applications. FBT couplers in which the optical power is evenly divided between the output fibers are commonly referred to as splitters. It should also be noted that similarly performing tap couplers and splitters can be implemented using different technologies, including thin-film optical coatings.

Figure 5:
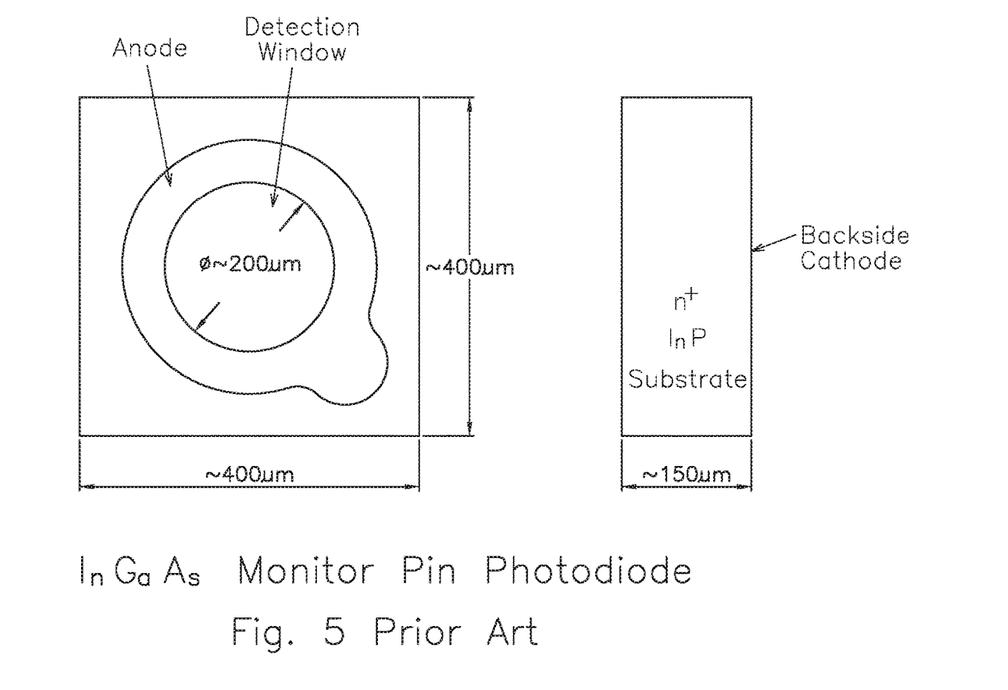
FIG. 5 shows a typical example of an InGaAs PIN photodiode for converting optical power to electrical power, for use as a photo-detector.

FIG. 5 shows the typical dimensions of an InGaAs PIN (p-type, intrinsic, n-type) photodiode, in bare chip form. PIN diodes are so named because they have a wide, un-doped region of intrinsic semiconductor material, between the doped p-type and n-type semiconductor material. In contrast to ordinary PN diodes, PIN diodes do not perform well as rectifiers, but they are well-suited to use as photo-detectors.

Figure 6:
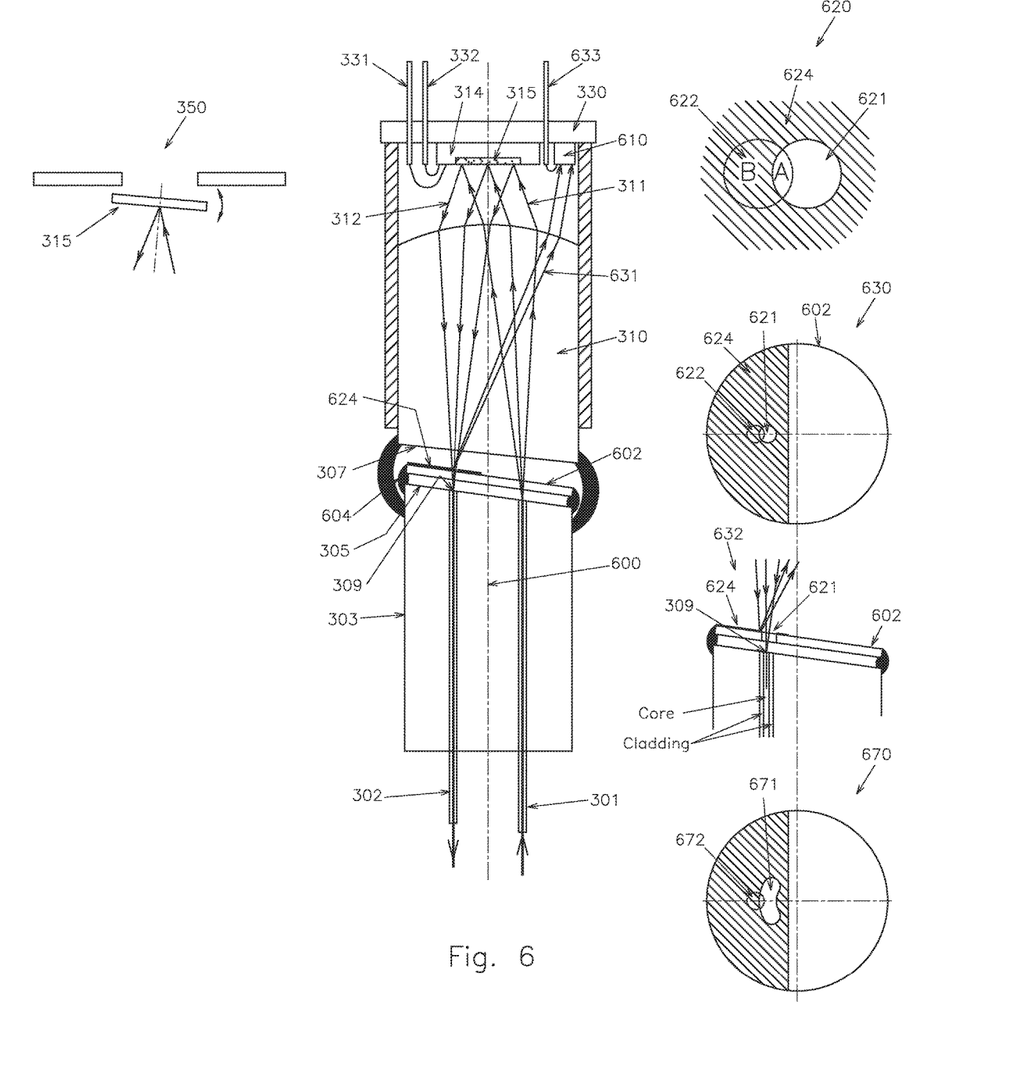
FIG. 6 illustrates one embodiment of in which a pin hole aperture is located in front of the output fiber core, in order to split off a portion of the optical power that is entering the output fiber.

A first set of exemplary embodiments integrate the functions of three optical components: a VOA (or an optical switch), plus a tap coupler, and a photo-detector, into a single compact package, which can result in saving space, and reducing cost and complexity. FIG. 6 shows one embodiment. The VOA function can be adopted from a VOA structure such as that described above with respect to FIG. 3. However, as shown in FIG. 6, the prior art VOA structure of FIG. 3 is modified by inserting a pin hole plate 602 between the lens 310 and the ferrule 303. In addition, a photo-detector, such as a photodiode chip 610 similar to what is shown in FIG. 5, is set to one side of the MEMS chip 314, and can be mounted to the chip header 330.

As indicated by cross-section view 630, and the enlarged view indicated by arrow 620, a pin hole aperture 621 is surrounded by reflective coating 624. The reflective coating 624 adjacent to the pin hole can be implemented using metals, such as gold or aluminum, or it can be implemented as a dielectric thin film coating stack. In either case, the reflective coating 624 can be deposited or fabricated on top of a transparent circular plate 602. The fiber core end face 309 of output fiber 302 is located right beneath the pin hole 621 to pick up light that passes through the pin hole 621. This is shown in inset drawing 632, which represents a side view of the transparent circular plate 602, as mounted to fiber ferrule 303. The diameter of the pin hole 621 is equal to or slightly larger than that of the fiber core end face 309, which is about 10 microns for single mode fibers and 30 to 100 microns for multi-mode fibers. The pattern of the pin hole 621 and its surrounding reflective coating can be created by patterning methods such as photo-lithography, followed by chemical etching. The pin hole plate 602 can attached to the ferrule 303 through use of a bonding material such as epoxy or soldering, as represented by item 604. A small air gap of less than 1 mm is preferred between the pin hole plate 602 and the slanted surface 305, and also between the pin hole plate 602 and the slanted lens surface 307. The pin hole plate 602 is oriented at small angle with respect to the optical axis 600, in order to direct the light that is reflected by reflective coating 624, back to the photodiode 610, as described more fully below. It is worth noting that the pin hole 621 is not necessary to be a circular hole as long as it can split the output light spot 622 into transmission to the output fiber 302 and reflection to the photo-detector 610. As shown in inset 670 of FIG. 6, the pinhole 671 is an opening of an arc stripe that allows the ferrule 303 to rotate around the optical axis 600 with respect to the pin hole plate 602 for optimizing optical alignment without obstructing the light spot 672 to partially transmit to the output fiber 302.

As explained with respect to FIG. 3, and as shown again in FIG. 6, the location of focused light spot 622 is controlled by the tilting angle of the rotatable mirror 315. When the mirror 315 is tilted to a certain angle θ by an external voltage σ applied to the MEMS chip 314, the light spot 622 is partially overlapped with the pin hole 621, as indicated by region "A" in the enlarged cross-section view 620. The remaining portion of light spot 622 is indicated by region "B". The "A" portion of light spot 622 passes through the pin hole 621 and is coupled to the output fiber 302. However, the "B" portion of light spot 622 is reflected by the reflective layer 624, and then passes through the lens 310 a second time, as indicated by rays 631. The reflected, collimated light that emerges from the lens 310 finally hits the photo-diode 610, and this light energy is converted by photodiode 610 into an electric current, which flows through electrode 633 to an external electronic circuit (not shown in FIG. 6) that reads the current and converts it to a voltage $V_d$.

The input optical power from input port (input fiber 301), and the output optical power of the light transmitted through the first opening that is coupled to the output port (output fiber 302), are denoted by $P_{in}$ and $P_{out}$ respectively, and the coupling efficiency between the input fiber 301 and the output fiber 302 is defined as φ:

$$P_{out} = \varphi P_{in}, 0 \leq \varphi \leq 1 \quad \text{Eq (1)}$$

The coupling efficiency φ is dependent on the tilting angle θ of the rotatable mirror 315, that is in turn controlled by the applied MEMS chip driving voltage σ. Thus, φ is a function of σ, namely φ=φ(σ). (More generally, the mirror may rotate about more than one axis, which can be useful for alignment purposes or when there are multiple input or output ports, such as is described further below with respect to FIGS. 8A and 8B.) The relationship between φ and σ is a characteristic of the integrated component illustrated in FIG. 6, and this relationship or function can be fully tabulated numerically by measuring the ratio of output optical power to input optical power, as a function of the driving voltage σ. The resulting table of numeric values can therefore be used to obtain a desired attenuation value between the input optical power and the output optical power, by applying the appropriate driving voltage σ.

Figure 8A:
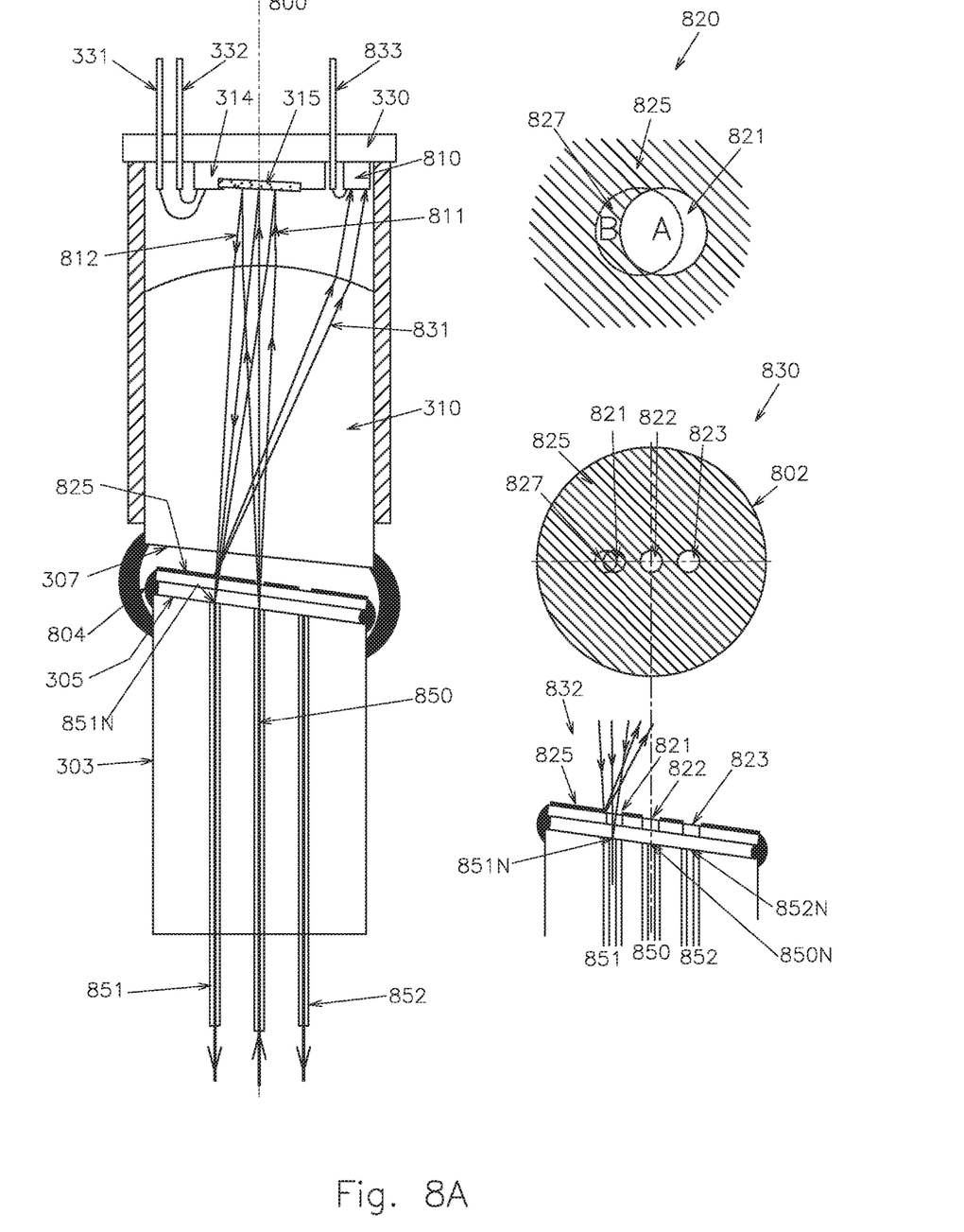
FIGS. 8A and 8B show another embodiment, based on a 1×2 optical switch, or two-channel VOA, with two output fibers.
Figure 8B:
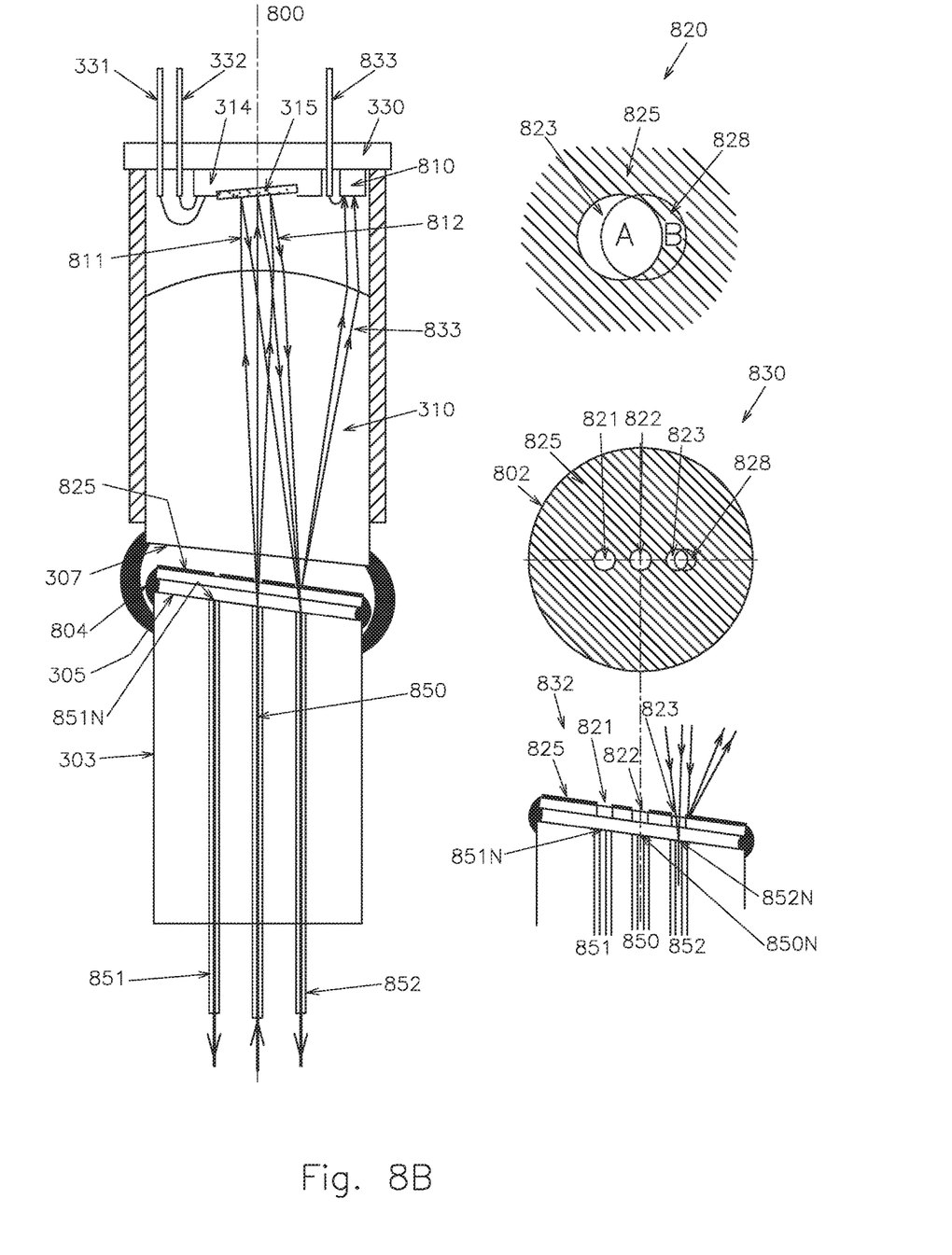

The photo-detector circuit's output voltage $V_d$ can be defined as follows:

$$V_d = \eta(1-\varphi)P_{in} \quad \text{Eq (2)}$$

where η is a coefficient that depends on multiple parameters and characteristics of the integrated component shown in FIG. 6. These multiple parameters and characteristics include: the geometric form and design of the pin hole plate 602, pin hole 621, and reflective surface 624, the coupling of optical power that is reflected from reflective surface 624 to the photodiode 610, and the conversion of photodiode current to voltage $V_d$ by the associated photo-detector circuitry. The values of coefficient η can be obtained by a measurement, as a function of both the input optical power $P_{in}$, and the applied MEMS chip driving voltage σ. In the exemplary embodiments, the output voltage $V_d$ or other output indication from the photo-detector will be an increasing or decreasing function (or, more generally, a monotonically non-decreasing or non-increasing function) of the intensity of light incident upon it; but in other embodiments, such as in multiplexing or de-multiplexing applications such as described below with respect FIGS. 8A and 8B, a binary sort of yes/no output can be useful to determine to an active port.

When a definite output power $P_{out}$ is required, the following procedure can be used:
1. Read $V_d$ and
2. Based on the present (known) value of σ, and $V_d$, look up φ
3. Calculate $P_{in}$, using Eq (2)
4. Using Eq (1), choose a new φ by adjusting σ to get the desired $P_{out}$ All of the above procedures can be achieved by a simple electronic circuit, or by a microcontroller circuit that has access to tables of calibrated values that describe the functions shown as Eq (1) and Eq (2).

The embodiments described above with respect to FIG. 6, as well as those described below with respect to FIGS. 7, 8A, and 8B, use "back-end" monitoring, where the photo-detector is used to measure the output power, $P_{out}$. Alternately, or additionally, it is possible to use "front-end" monitoring, where the input power, $P_{in}$, can be measured. For example, in order to monitor the input power a small hole can be opened around the center of the rotatable mirror 315 to tap a small percentage of power coming from input fiber 301 and a photo-detector (not shown in the drawings) can be installed beneath the opening to detect the tapped power. (Depending on the embodiment, this hole can be through the reflecting surface of the mirror 315 or through the mirror and an underlying actuator or other structure.) Besides reading the input power from input fiber 301, this front-end monitoring can be used to check whether or not the variable attenuation functions operate properly as designed when the measured input power is compared with that being obtained from Eq (2).

Figure 7:
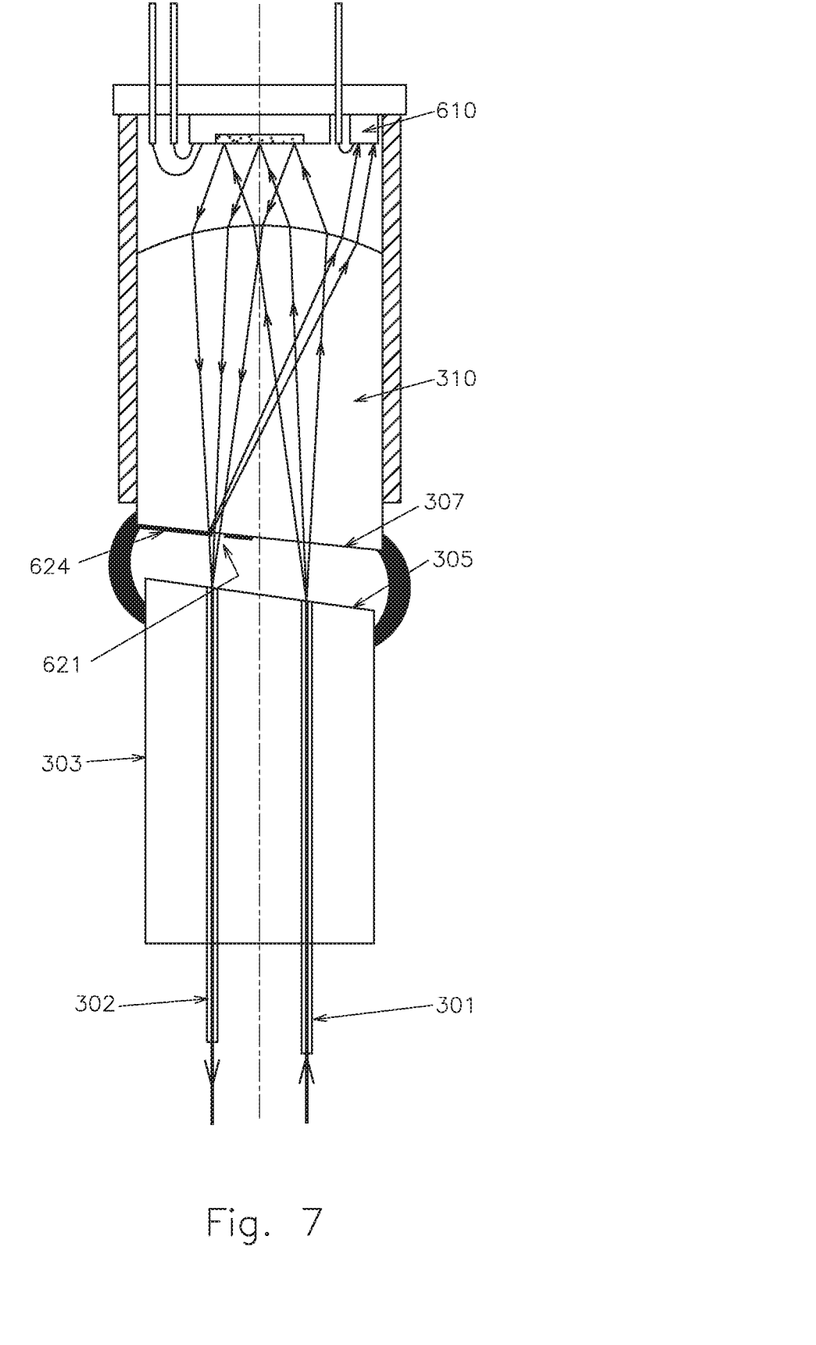
FIG. 7 illustrates another embodiment, in which the pin hole is printed or deposited onto the slanted surface of a collimation lens.

FIG. 7 shows another embodiment in which the reflective coating 624 and the pin hole 621 are applied directly onto the slanted surface 307 of the lens 310, to eliminate the need for transparent substrate 602 (as was used in the embodiment shown in FIG. 6). In the embodiment of FIG. 7, the angle of slanted surface 307 must be designed to reflect light from reflective surface 624 back to the photodiode 610. In another embodiment, not shown here but similar to the embodiment shown in FIG. 7, the reflective coating 624 and the pin hole 621 could alternatively be applied directly to the slanted surface 305 of the fiber ferrule 303.

In addition to VOAs, similar device structures comprising a MEMS chip with a rotatable mirror, having either one degree or two degrees of rotational freedom, can be used to implement 1×2 (or 2×1) optical switches, as well as 1×N (or N×1) optical switches (refer to U.S. Pat. No. 6,628,856). A 1×N optical switch configuration has one input fiber and N output fibers. Since the optical path through such a switch can be designed to be bi-directional, the same structure may also be configured as an N×1 optical switch, with N input fibers and one output fiber.

FIG. 8A illustrates an embodiment in which a 1×2 optical switch or two-channel VOA is equipped with a tap monitoring or tap detector function. Fiber 850 is the common fiber, used in this example as an input fiber, and Fiber 851 and Fiber 852 are two output fibers. Their respective fiber end faces 850N, 851N, and 852N (refer to inset drawing 832) are located right beneath three corresponding pin holes 822, 821, and 823, respectively, of a pin hole plate 825, which is inserted between slanted lens surface 307 and the ferrule surface 305. As the mirror 315 is tilted by a certain small angle toward the output fiber 1, 851, the optical power emerging from the common or input fiber 850, shown as rays 811, is reflected by the mirror 315 to become rays 812, and is then coupled to output fiber 1 (851). In addition, a small percentage of the optical power, as indicated by region "B" of inset drawing 820, is reflected by the reflective coating 825 to become rays 831, which strike the photodiode 810. In addition to performing as an optical switch, one skilled in the art will recognize that the mirror 315 can be slightly tuned or tilted to vary the power being coupled to output fiber 1 (851), to provide variable attenuation, thereby acting like a VOA. Therefore the embodiment shown in FIG. 8A can be used as either a 1×2 optical switch, or as a two-channel VOA.

FIG. 8B shows that the optical power from the common or input fiber can also be coupled to the other channel or output fiber. The input beam 811 is now coupled to the second output fiber 852. Similarly to what was described for FIG. 8A, in FIG. 8B a small percentage of the optical power is reflected by the reflective surface surrounding pin hole 823, to be directed as rays 833 to the photodiode 810. Because the beam size of rays 833 is generally significantly larger than the detection window (or light sensitive area) of a photodiode (refer to FIG. 5), and because modern photodiodes and photo-detectors can detect optical power down to nano-watt levels, the same photodiode 810 that is used to monitor output fiber 1 (851) can also be used for monitoring output fiber 2 (852). Thus, as long as the coupling ratio to the photodiode is fixed and stable, the number or amount of photons that hit the photodiode is not a major concern. However, if optimizing of the received optical power to the photodiode is desired, for both output fibers, then a second photodiode (not shown in FIG. 8B) can be added, close to the first photodiode 810. More generally, for the 1×N (or N×1) optical switch case, up to N photo-detectors could be used, depending on the embodiment.

Embodiments of the dual-channel or two-output switching configuration shown in FIGS. 8A and 8B can be bi-directional, or optically reversible. The input and output ports in FIGS. 8A and 8B can be swapped without substantially affecting optical performance. In the case of a 2×1 optical switch configuration, or the corresponding two-channel VOA configuration, with two input fibers and one output fiber, optical power is reflected by the reflective area surrounding the pin hole that is associated with the one output port, towards the photodiode.

Similarly, the configuration shown in FIGS. 8A and 8B, with two output fibers, can be expanded to have N channels or N output fibers, with N>2. In a configuration with N>2 channels or output fibers, the mirror 315 would typically have two degrees of rotational freedom, or axes of rotation. This removes the constraint that the multiple output fibers be located in a line. In one embodiment, the N output fibers could be bundled together in a common ferrule bore. In another embodiment, the N output fibers could be held in multiple ferrule bores. Additional photodiodes, located around the MEMS chip 314, may be required to monitor each of the N individual output channels or fibers. As with the 1×2 (2×1) embodiment shown in FIGS. 8A and 8B, the 1×N embodiments are also bidirectional, or optically reversible. In the case of an N×1 optical switch configuration, or the corresponding N-channel VOA configuration, with N input fibers and one output fiber, optical power is reflected by the reflective area surrounding the pin hole that is associated with the one output port, towards the photodiode.

The foregoing detailed description has been presented for purposes of illustration and description. It is not intended to be exhaustive or to limit the invention to the precise form disclosed. Many modifications and variations are possible in light of the above teaching. The described embodiments were chosen in order to best explain the principles involved and their practical application, to thereby enable others skilled in the art to best utilize the various embodiments and with various modifications as are suited to the particular use contemplated. It is intended that the scope of the invention be defined by the claims appended hereto.

It is claimed:

1. A tunable optical device, comprising:
 a reflector positionable to reflect a portion of a beam of light incident thereupon from a first input port in an optical path between the first input port and a first output port;
 a surface located in the optical path between the reflector and the first output port, the surface having a first opening through which the reflected portion of the light beam is transmittable between the reflector and the first output port, wherein the first opening has an adjacent reflective region on the surface;
 a first photo-detector configured such that a portion of the beam of light incident on the reflective region adjacent to the first opening is reflected thereon; and
 an actuator connected to change a position of the reflector so that a selectable amount of the beam of light reflected from the reflector is transmitted through the first opening along the optical path from the first input port to the first output port.

2. The tunable optical device of claim 1, further comprising:
 one or more lenses in the optical path between the reflector and the surface, whereby the reflected portion of the light beam is focused on the surface.

3. The tunable optical device of claim 2, wherein the one or more lenses are further in the optical path between the first input port and the reflector, whereby light incident on the reflector from the first input port is collimated.

4. The tunable optical device of claim 2, wherein the one or more lenses are further in the optical path between the surface and the first photo-detector, whereby light incident on the first photo-detector from the reflective region adjacent to the first opening is collimated.

5. The tunable optical device of claim 2, wherein the surface is a surface of one of the one or more lenses.

6. The tunable optical device of claim 5, wherein the plate is further in the optical path between first input port and the reflector.

7. The tunable optical device of claim 1, further comprising:
 a plate in the optical path between the reflector and the first output port, wherein the surface is a surface of the plate.

8. The tunable optical device of claim 1, wherein the tunable optical device is part of an optical system further including control circuitry connected to the first photo-detector to receive an indication of an amount of light incident thereupon and connected to the actuator to change the position of the reflector in response to said indication.

9. The tunable optical device of claim 1, further comprising:
 a ferrule including the first input port and first output port.

10. The tunable optical device of claim 1, wherein the reflector and actuator are implemented as part of a micro-electro-mechanical-system (MEMS) device.

11. The tunable optical device of claim 1, wherein the first opening is an arc shaped aperture in the reflective region.

12. The tunable optical device of claim 1, wherein the first photo-detector includes a PIN (p-type, intrinsic, n-type) type photodiode.

13. The tunable optical device of claim 1, wherein the first photo-detector generates an output signal that is a monotonically non-decreasing or a monotonically non-increasing function of an intensity of the incident light thereon.

14. The tunable optical device of claim 1, wherein:
the reflector is further positionable to reflect a portion of a beam of light incident thereupon from the first port in an optical path between the first input port and one or more second output ports;
the surface is further located in the optical path between the reflector and the one or more second output ports, the surface having one or more second openings through which the reflected portion of the light beam is transmittable between the reflector and a corresponding one of the second output ports, wherein each of the second openings has an adjacent reflective region on the surface;
the first photo-detector is further configured such that a portion of the beam of light incident on the reflective regions adjacent to the second openings is reflected thereon; and
the actuator is further connected to change a position of the reflector so that a selectable amount of the beam of light reflected from the reflector is transmitted through the second opening along the optical path from the first input port to a selected one of the second output ports.

15. The tunable optical device of claim 1, further comprising:
one or more second photo-detectors, wherein:
the reflector is further positionable to reflect a portion of a beam of light incident thereupon from the first input port in an optical path between the first input port and one or more second output ports;
the surface is further located in the optical path between the reflector and the one or more second output ports, the surface having one or more second openings through which the reflected portion of the light beam is transmittable between the reflector and a corresponding one of the second output ports, wherein each of the second openings has an adjacent reflective region on the surface;
the second photo-detectors are configured such that a portion of the beam of light incident on the reflective regions adjacent to the second openings is reflected on one of the second photo-detectors; and
the actuator is further connected to change a position of the reflector so that a selectable amount of the beam of light reflected from the reflector is transmitted through the second opening along the optical path from the first input port to a selected one of the second output ports.

16. The tunable optical device of claim 15, wherein the first and second photo-detectors include PIN (p-type, intrinsic, n-type) type photodiodes.

17. The tunable optical device of claim 15, wherein the first and second photo-detectors generate output signals that are monotonically non-decreasing or monotonically non-increasing functions of the intensity of the incident light thereon.

18. The tunable optical device of claim 1, wherein:
the reflector is further positionable to reflect a portion of a beam of light incident thereupon from one or more second inputs port in an optical path between the second input port and the first output port; and
the actuator is further connected to change a position of the reflector so that a selectable amount of the beam of light reflected from the reflector is transmitted through the first opening along the optical path from a selected one of the second input port to first output port.

19. The tunable optical device of claim 1, wherein a surface of the reflector has an opening, the tunable optical device further comprising:
a second photo-detector configured such that a portion of the beam of light incident on the opening of the reflector is incident on the second photo-detector.

20. An optical system, comprising:
a tunable optical device, including:
a reflector positionable to reflect a portion of a beam of light incident thereupon from an input port in an optical path between the input port and an output port;
a surface located in the optical path between the reflector and the output port, the surface having an opening through which the reflected portion of the light beam is transmittable between the reflector and the output port, wherein the opening has an adjacent reflective region on the surface;
a first photo-detector configured such that a portion of the beam of light incident on the reflective region adjacent to the opening is reflected thereon; and
an actuator connected to change a position of the reflector so that a selectable amount of the beam of light reflected from the reflector is transmitted through the opening along the optical path from the input port to the output port; and
control circuitry connected to the first photo-detector to receive an indication of an amount of light incident thereupon and connected to the actuator to change the position of the reflector in response to said indication.

21. The optical system of claim 20, wherein the actuator adjusts the position of the reflector in response to said indication based upon a table of calibrated values relating values of the indication to the amount of light transmitted to the output port.

22. The optical system of claim 20, wherein said indication is a voltage that is a monotonically non-decreasing or monotonically non-increasing function of the function of the intensity of an incident light on the first photo-detector.

23. The optical system of claim 20, wherein the reflector and actuator are implemented as part of a micro-electro-mechanical-system (MEMS) device.

24. The optical system of claim 20, wherein a surface of the reflector has an opening, the tunable optical device further comprising:
a second photo-detector configured such that a portion of the beam of light incident on the opening of the reflector is incident on the second photo-detector, wherein the control circuitry is further connected to the second photo-detector to receive an indication of an amount of light incident thereupon.

25. A method, comprising:
receiving a beam of light from a first port;
reflecting a portion of the beam of light from the first port by a reflector in an optical path between the first port and a second port, wherein the optical path includes a surface located between the reflector and the second port, the surface having a first opening through which the reflected portion of the light beam is transmittable between the reflector and the second port, and wherein the first opening has an adjacent reflective region on the surface;

reflecting a portion of the beam of light that is incident on the reflective region adjacent to the first opening on to a first photo-detector; and positioning the reflector so that a selectable amount of the beam of light reflected from the reflector is transmitted through the first opening along the optical path from the first port to the second port.

26. The method of claim 25, further comprising:
focusing the reflected portion of the light beam on the surface by one or more lenses in the optical path between the reflector and the surface.

27. The method of claim 26, wherein the one or more lenses are further in the optical path between the first port and the reflector, the method further comprising:
collimating light incident on the reflector from the first port by the one or more lenses.

28. The method of claim 26, wherein the one or more lenses are further in the optical path between the surface and the first photo-detector, the method further comprising:
collimating light incident on the first photo-detector from the reflective region adjacent to the first opening by the one or more lenses.

29. The method of claim 26, wherein the surface is a surface of one of the one or more lenses.

30. The method of claim 25, wherein the surface is a surface of a plate in the optical path between the reflector and the second port.

31. The method of claim 30, wherein the plate is further in the optical path between the first port and the reflector.

32. The method claim 25, further comprising:
receiving an indication of an amount of light incident upon the photo-detector; and
changing the position of the reflector in response to said indication.

33. The method of claim 32, wherein the indication is a monotonically non-decreasing or a monotonically non-increasing function of an intensity of the incident light thereon.

34. The method of claim 32, wherein the position of the reflector is changed in response to said indication based upon a table of calibrated values relating values of the indication to the amount of light transmitted to the second port.

35. The method of claim 25, wherein the reflector is positioned by an actuator and wherein the reflector and actuator are implemented as part of a micro-electro-mechanical-system (MEMS) device.

36. The method of claim 25, wherein the second port is one of a plurality of output ports, the method further comprising:
positioning the reflector so that the beam of light reflected from the reflector is transmitted through the second port.

37. The method of claim 25, wherein the first port is one of a plurality of input ports, the method further comprising:
positioning the reflector so that the beam of light from the first port is reflected from the reflector and transmitted through the second port.

* * * * *

UNITED STATES PATENT AND TRADEMARK OFFICE
CERTIFICATE OF CORRECTION

PATENT NO. : 10,429,591 B2
APPLICATION NO. : 15/184722
DATED : October 1, 2019
INVENTOR(S) : Lee et al.

Page 1 of 1

It is certified that error appears in the above-identified patent and that said Letters Patent is hereby corrected as shown below:

In the Claims

Column 10, Line 52 (Claim 6, Line 2): After "between" and before "first" insert -- the --.

Column 12, Line 4 (Claim 18, Line 4): After "second" and before "port" delete "inputs" and insert -- input --.

Column 12, Line 10 (Claim 18, Line 10): After "input" and before "first" delete "port to" and insert -- ports to the --.

Signed and Sealed this
Eighth Day of September, 2020

Andrei Iancu
*Director of the United States Patent and Trademark Office*